(12) United States Patent
Li et al.

(10) Patent No.: US 10,977,523 B2
(45) Date of Patent: Apr. 13, 2021

(54) METHODS AND APPARATUSES FOR IDENTIFYING OBJECT CATEGORY, AND ELECTRONIC DEVICES

(71) Applicant: BEIJING SENSETIME TECHNOLOGY DEVELOPMENT CO., LTD, Beijing (CN)

(72) Inventors: Buyu Li, Beijing (CN); Junjie Yan, Beijing (CN)

(73) Assignee: BEIJING SENSETIME TECHNOLOGY DEVELOPMENT CO., LTD, Beijing (CN)

(*) Notice: Subject to any disclaimer, the term of this patent is extended or adjusted under 35 U.S.C. 154(b) by 108 days.

(21) Appl. No.: 16/423,061

(22) Filed: May 27, 2019

(65) Prior Publication Data
US 2019/0279045 A1 Sep. 12, 2019

Related U.S. Application Data

(63) Continuation of application No. PCT/CN2017/116218, filed on Dec. 14, 2017.

(30) Foreign Application Priority Data

Dec. 16, 2016 (CN) .......................... 201611168161.7

(51) Int. Cl.
*G06K 9/62* (2006.01)
*G06T 7/70* (2017.01)
(Continued)

(52) U.S. Cl.
CPC ............. *G06K 9/6267* (2013.01); *G06K 9/46* (2013.01); *G06K 9/4638* (2013.01); *G06K 9/62* (2013.01);
(Continued)

(58) Field of Classification Search
CPC ...... G06K 9/6262; G06K 9/0014; G06K 9/34; G06K 9/6256; G06N 3/08; G06N 3/0454
(Continued)

(56) References Cited

U.S. PATENT DOCUMENTS

2016/0267359 A1* 9/2016 Gan ...................... G06K 9/6228
2017/0032285 A1 2/2017 Sharma et al.

FOREIGN PATENT DOCUMENTS

CN 104463172 A 3/2015
CN 104657706 A 5/2015
(Continued)

OTHER PUBLICATIONS

First Office Action of the Chinese application No. 201611168161.7, dated Jan. 3, 2020.
(Continued)

*Primary Examiner* — Amandeep Saini
(74) *Attorney, Agent, or Firm* — Syncoda LLC; Feng Ma

(57) ABSTRACT

Methods, apparatuses and electronic devices for identifying an object category include: determining M key point neighborhood regions from corresponding object candidate boxes according to position information of M key points in a plurality of object candidate boxes of an image to be detected, where M is less than or equal to the total number of key points of N preset object categories, and M and N are positive integers; and determining category information of at least one object in the image to be detected using a convolutional neural network model used for identifying an object category in the image according to the M key point neighborhood regions.

18 Claims, 4 Drawing Sheets

(51) Int. Cl.
  *G06K 9/46* (2006.01)
  *G06N 3/08* (2006.01)
  *G06N 20/00* (2019.01)

(52) U.S. Cl.
  CPC ......... *G06K 9/6228* (2013.01); *G06K 9/6232* (2013.01); *G06K 9/6262* (2013.01); *G06N 3/08* (2013.01); *G06N 20/00* (2019.01); *G06T 7/70* (2017.01); *G06T 2207/20081* (2013.01); *G06T 2207/20084* (2013.01)

(58) Field of Classification Search
  USPC ....................................................... 382/157
  See application file for complete search history.

(56) References Cited

FOREIGN PATENT DOCUMENTS

| | | |
|---|---|---|
| CN | 104680508 A | 6/2015 |
| CN | 105335702 A | 2/2016 |
| CN | 105678284 A | 6/2016 |
| CN | 105868269 A | 8/2016 |
| CN | 106228158 A | 12/2016 |
| WO | 2015157526 A1 | 10/2015 |

OTHER PUBLICATIONS

Second Office Action of the Chinese application No. 201611168161.7, dated Aug. 24, 2020.
Richard Lepage et al. "Cellular Neural Network for the Extraction of Linked Visual Features", Aug. 6, 2002, p. 1176-1181.
Li Ming; "Research and Application of Target Detection and Recognition Algorithm", Feb. 15, 2016.
Dec. 31, 2015 (Dec. 31, 2015), entire document, (Huang, Zi,"A Target Detection Model Based on Convolutional Neural Networks", Master's Dissertation of Shanghai Jiao Tong University).
International Search Report in the international application No. PCT/CN2017/116218, dated Feb. 28, 2018.
English translation of the Written Opinion of the International Search Authority in the international application No. PCT/CN2017/116218, dated Feb. 28, 2018.

* cited by examiner

METHODS AND APPARATUSES FOR IDENTIFYING OBJECT CATEGORY, AND ELECTRONIC DEVICES

CROSS-REFERENCE TO RELATED APPLICATIONS

This is a continuation application of International Patent Application No. PCT/CN2017/116218, filed on Dec. 14, 2017, which claims priority to Chinese Patent Application No. CN201611168161.7, filed on Dec. 16, 2016. The disclosures of these applications are incorporated herein by reference in their entirety.

BACKGROUND

With the development of computer vision technology, object detection has become a core issue in computer vision research. Object detection is to detect the position of an object in a given image and identify the category of the object. It can be specifically divided into two processes, i.e., object positioning and object identification. Object positioning is to find an enclosing rectangular box including an object (i.e., an object candidate box) in the image. Object identification is to determine the category of the object in the object candidate box after obtaining the object candidate box, or determine the region as a background if there is no object in the candidate box.

SUMMARY

The present disclosure relates to the field of computer vision technology, and in particular, to methods and apparatuses for identifying an object category, and electronic devices.

Embodiments of the present disclosure provide technical solutions for identifying an object category.

A method for identifying an object category is provided according to an aspect of the embodiments of the present disclosure. The method is performed by an electronic device and the method includes: determining, according to position information of M key points in a plurality of object candidate boxes of an image to be detected, M key point neighborhood regions from corresponding object candidate boxes, where M is less than or equal to the total number of key points of N preset object categories, and M and N are positive integers; and determining, according to the M key point neighborhood regions, category information of at least one object in the image to be detected using a convolutional neural network model used for identifying an object category in an image.

An electronic device for identifying an object category is further provided according to another aspect of the embodiments of the present disclosure. The electronic device includes a processor and a memory for storing instructions executable by the processor, wherein execution of the instructions by the processor causes the processor to perform: determining, according to position information of M key points in a plurality of object candidate boxes of an image to be detected, M key point neighborhood regions from corresponding object candidate boxes, wherein M is less than or equal to the total number of key points of N preset object categories, and M and N are positive integers; and determining, according to the M key point neighborhood regions, category information of at least one object in the image to be detected using a convolutional neural network model used for identifying an object category in an image.

An electronic device is provided according to still another aspect of the embodiments of the present disclosure. The electronic device includes: a processor, a memory, a communication element, and a communication bus, where the processor, the memory, and the communication element communicate with one another by means of the communication bus; and the memory is configured to store at least one executable instruction, and the executable instruction causes the processor to execute corresponding operations of the foregoing method for identifying an object category.

A computer program is provided according to still another aspect of the embodiments of the present disclosure. The computer program includes computer instructions, where when the computer instructions run in a processor of a device, the processor executes steps for implementing the foregoing method for identifying an object category.

A non-transitory computer readable storage medium is further provided according to yet another aspect of the embodiments of the present disclosure, with a computer program stored thereon, where the computer program includes computer-readable instructions, where execution of the instructions by the processor causes the processor to perform: determining, according to position information of M key points in a plurality of object candidate boxes of an image to be detected, M key point neighborhood regions from corresponding object candidate boxes, wherein M is less than or equal to the total number of key points of N preset object categories, and M and N are positive integers; and determining, according to the M key point neighborhood regions, category information of at least one object in the image to be detected using a convolutional neural network model used for identifying an object category in an image.

According to the methods and apparatuses for identifying an object category and the electronic devices provided by the embodiments of the present disclosure, key point neighborhood regions are determined from corresponding object candidate boxes according to position information of key points in object candidate boxes, and category information of an object in the image to be detected is further determined by means of the key point neighborhood regions and a convolutional neural network model used for identifying an object category in the image. By means of the position information of the key points, the defects of vagueness of information in the candidate boxes, and information loss caused for the identification process are avoided, thereby improving the identification accuracy during identification of a single category or multiple categories of objects. It is especially advantageous to improve the identification accuracy during identification of multiple categories of objects.

BRIEF DESCRIPTION OF DRAWINGS

The accompanying drawings constituting a part of the specification describe embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Exemplary embodiments of the present disclosure are now described in detail with reference to the accompanying drawings.

A person skilled in the art may understand that the terms such as "first" and "second" in the embodiments of the methods are only used to distinguish different steps, devices or modules, etc., and do not represent any specific technical meaning or an inevitable logical sequence therebetween. For the term "and/or" throughout the present disclosure, the symbol "/" refers to "or," for example, "A and/or B" including "A," "B," and "A and B."

Figure 1:
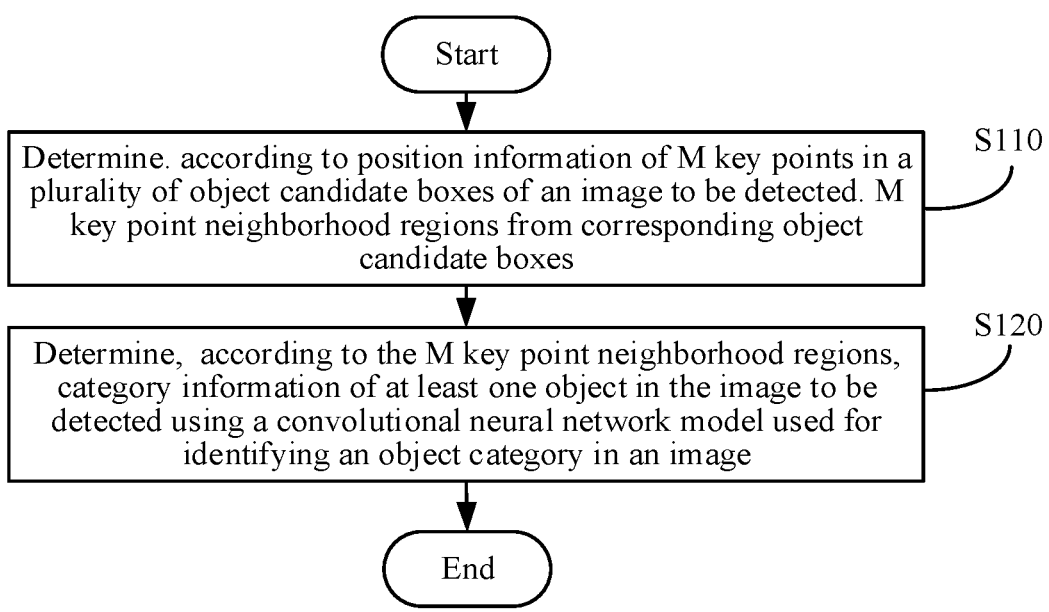
FIG. 1 illustrates a flowchart of a method for identifying an object category according to the embodiments of the present disclosure.

FIG. 1 is a flowchart of a method for identifying an object category according to the embodiments of the present disclosure. The method is executed by a device including an apparatus for identifying an object category.

With reference to FIG. 1, in step S110, M key point neighborhood regions are determined from corresponding object candidate boxes according to position information of M key points in a plurality of object candidate boxes of an image to be detected.

Here, the object candidate box may be an enclosing rectangular box that may include an object in the image. The image to be detected may be a picture, a photograph, a certain image frame in a video, or the like, but is not limited thereto. For example, if a photograph of a dog is captured by a camera on a mobile terminal, then the photograph is an image to be detected, and an enclosing rectangular box including the dog on the photograph is an object candidate box. If the photograph further includes other objects such as a chair, similarly, an object candidate box may be used to position the other objects such as the chair. Accordingly, the photograph as the image to be detected includes a plurality of object candidate boxes.

M is less than or equal to the total number of key points of N preset object categories, for example, M is the total number of the key points of the N preset object categories. M and N are positive integers, and there is at least one key point of at least one object category in each object candidate box, for example, 0<N≤200, 200<M≤4000.

Taking a common object detection data set (such as PASCAL VOC) as an example, 20 object categories, such as a person, a dog, a train, and a chair, are preset and may be collectively referred to as a non-background category, and objects other than the 20 categories are defined as a background category. Thus, the object identification problem translates into a classification problem involving 21 categories. For each category, the number of key points is defined. For example, if the category is a person, 11 key points, such as head, left hand, right hand, left shoulder, and right shoulder, may be defined, and if the category is a dog, 10 key points, such as head, limbs, and tail, may be defined. Position information of a key point may be coordinate data of the key point, and the position information of the key point in the object candidate box may be obtained by key point prediction technology. For example, key point prediction is performed by means of a convolutional neural network. As an optional example, in the present disclosure, a group of key points are predicted by means of a convolutional neural network for each preset object category, such that one group of key points correspond to one object category, and each key point in each group of key points corresponds to its position information in the image to be detected.

After obtaining the position information of the M key points, it is necessary to determine the sizes of key point neighborhood regions for subsequent pooling. The key point neighborhood region in the present disclosure refers to a region including a key point and a certain area around the key point.

Accordingly, if the object category is a non-background category, according to an exemplary embodiment of the present disclosure, step S110 includes: determining, according to size information of the corresponding object candidate boxes and a preset size multiple, M rectangular regions respectively centered on the positions of the M key points as the M key point neighborhood regions.

If the object category is a background category, according to an exemplary embodiment of the present disclosure, step S110 includes: determining regions of object candidate boxes corresponding to the position information of the M key points as the M key point neighborhood regions.

For example, values between a quarter and a tenth of the width and height of the object candidate box are selected as the width and height of the key point neighborhood region. Assuming that the width of the object candidate box is w and the height thereof is h, then a region centered on the key point and having a width of w/5 and a height of h/5 may be taken as the key point neighborhood region of the key point. For a background category, the processing is different from the above, and the region of the entire object candidate box is taken as the key point neighborhood region.

In step S120, category information of at least one object in the image to be detected is determined using a convolutional neural network model used for identifying, according to the M key point neighborhood regions, an object category in an image.

In a specific implementation, taking 200 key points as an example, on the basis of feature maps obtained for the image to be detected by a plurality of convolutional layers of the convolutional neural network model, convolution in another layer is performed to convert the 200 feature maps into response maps of the 200 key points. The 200 key point neighborhood regions are mapped to the response maps of the corresponding key points to obtain 200 mapping regions, then the 200 mapping regions are pooled to obtain pooling results, and pooling results relating to one category are then subjected to equal-weight voting (i.e., averaged) to obtain a score for the category. The 21 scores including the score for the background category are input to softmax to obtain confidences of an object candidate box relating to the categories. Generally, the category with the highest confidence is selected as category information of the object in the object candidate box. If the confidence relating to the background category is the highest, it is determined that there is no object of a preset category in the object candidate box. Thus, the category information of the object in the object candidate box is obtained, that is, category information of the object in the image to be detected is determined. For example, assuming that a certain image to be detected contains five object candidate boxes, the confidences of four object candidate boxes relating to the background category are the highest, and the confidence of one object candidate box relating to a person is the highest, the category information of the object in the image identified by the method of this embodiment is a person.

According to the method for identifying an object category provided by this embodiment, an image to be detected containing a plurality of object candidate boxes is obtained, key point neighborhood regions are further determined from corresponding object candidate boxes according to position information of key points in the object candidate boxes, and category information of an object in the image to be detected is determined by means of the key point neighborhood regions and a convolutional neural network model used for identifying an object category in an image. By means of the position information of the key points, the defects of vagueness of information in the candidate boxes, and information loss caused for the identification process are avoided, thereby improving the identification accuracy of a single category or multiple categories of objects. It is especially advantageous to improve the identification accuracy of multiple categories of objects.

According to one or more embodiments of the present disclosure, the foregoing convolutional neural network model specifically includes K convolutional layers, a pooling layer, and an output layer, where K is a positive integer (for example, K is a positive integer greater than or equal to 2). Correspondingly, according to an exemplary embodiment of the present disclosure, step S120 includes: outputting, from the (K−1)th convolutional layer, feature maps having one-to-one correspondence to the M key points; outputting, from the Kth convolutional layer, a response map of a key point obtained after conversion of each of the feature maps; respectively mapping the M key point neighborhood regions to the response maps of the corresponding key points to obtain M mapping regions; outputting M pooling results corresponding to the M mapping regions from the pooling layer; and obtaining a first confidence of each preset object category from the output layer on the basis of the M pooling results, and determining the category information of the at least one object according to the first confidence relating to each preset object category.

In the process above, the obtaining, from the output layer, a first confidence of each preset object category based on the M pooling results includes: averaging pooling results corresponding to key points of a same preset object category to obtain a score for each preset object category; and obtaining, from the output layer, a first confidence of each preset object category according to the score for each preset object category.

Therefore, this embodiment further has the following technical effects: the feature maps for pooling generated by the last convolutional layer of the convolutional neural network model are response maps of key points of various categories of objects, the numbers of feature maps relating to different categories depend on the numbers of key points defined for the categories, and key point neighborhood regions relating to the categories are pooled on the feature maps. It can be seen that the pooling regions are determined by the positions of the key points, and the pooling regions relating to different categories are different, and thus, auxiliary identification information (i.e., the positions of the key points) is more effectively utilized, thereby further improving the object identification accuracy.

According to one or more embodiments of the present disclosure, before step S120, the method for identifying an object category further includes: training the convolutional neural network model.

The training the convolutional neural network model may include: obtaining a sample image including position information of the key points, object box marking information, and category marking information; performing convolution on the sample image to obtain a convolution result; determining, according to the object box marking information and the category marking information, whether object box position information and/or category information in the convolution result meets a training completion condition; in response to at least one of the object box position information or category information in the convolution result meets a training completion condition, completing training of the convolutional neural network model; and in response to at least one of the object box position information or category information in the convolution result does not meet a training completion condition, adjusting parameters of the convolutional neural network model according to the object box position information and/or the category information in the convolution result, and performing iterative training on the convolutional neural network model according to the adjusted parameters of the convolutional neural network model, until the object box position information and/or the category information after the iterative training meets the training completion condition. As an optional specific example, a sample image including position information of the key points, object box marking information, and category marking information is obtained; key point neighborhood regions are determined according to position information of key points in the sample image; feature maps having one-to-one correspondence to the key points are output from the (K−1)th convolutional layer; a response map of a key point obtained after conversion of each of the feature maps is output from the Kth convolutional layer; the key point neighborhood regions are respectively mapped to the response maps of the corresponding key points to obtain M mapping regions; pooling results corresponding to the mapping regions are output from the pooling layer; a first confidence of each preset object category is obtained from the output layer on based on the pooling results, and category information of at least one object in the sample image is determined according to the first confidence relating to each preset object category; whether identification result information output by the convolutional neural network model meets a training completion condition is determined according to the object box marking information and the category marking information in the sample image (e.g., whether changes in calculation results of a loss function for a consecutive predetermined number of times are less than a preset value); if yes (e.g., the changes in the calculation results of the loss function for the consecutive predetermined number of times are less than the preset value), training of the convolutional neural network model is completed; and if not (e.g., the changes in the calculation results of the loss function for the consecutive predetermined number of times are greater than or equal to the preset value), parameters of the convolutional neural network model are adjusted according to the identification result information output by the convolutional neural network model, and iterative training is performed on the convolutional neural network model according to the adjusted parameters of the convolutional neural network model, until the identification result information output by the convolutional neural network model meets the training completion condition. The loss function in the present disclosure may be a deviation function constructed for the deviation of the identification result information output by the convolutional neural network model from the object box marking information and the category marking information in the sample image.

In a specific implementation, a picture of a public data set such as PASCAL VOC may be used as the training data. There are 20 categories of objects in the PASCAL VOC. During model training, at least one picture and positions of key points relating to possible categories predicted by means of, for example, a convolutional neural network are input in each iteration, and marked standard position information indicating a real region including an object (i.e., the above object box marking information) and marked standard category information indicating the real category of the object (i.e., the above category marking information) are also input as supervision information to the convolutional neural network model. A loss layer is connected after the output layer of the convolutional neural network to calculate the loss function, and iteration is continuously performed by means of stochastic gradient descent so that parameters of the network are continuously updated until convergence. The function of the loss layer includes calculating the Euclidean distance or the like as the loss by using the object box position information output by the network and the standard position information as inputs. A classification layer (such as a fully connected layer in the output layer) takes classification results from the network (i.e., the scores for the categories) and the standard category information as inputs, and uses softmaxloss as the loss function.

After the above training of the convolutional neural network model, the convolutional neural network model may perform feature extraction on the image to be detected and classify an object in the object box on the basis of the key point neighborhood regions, thereby having the function of determining the category information of the object in the image to be detected.

Figure 2:
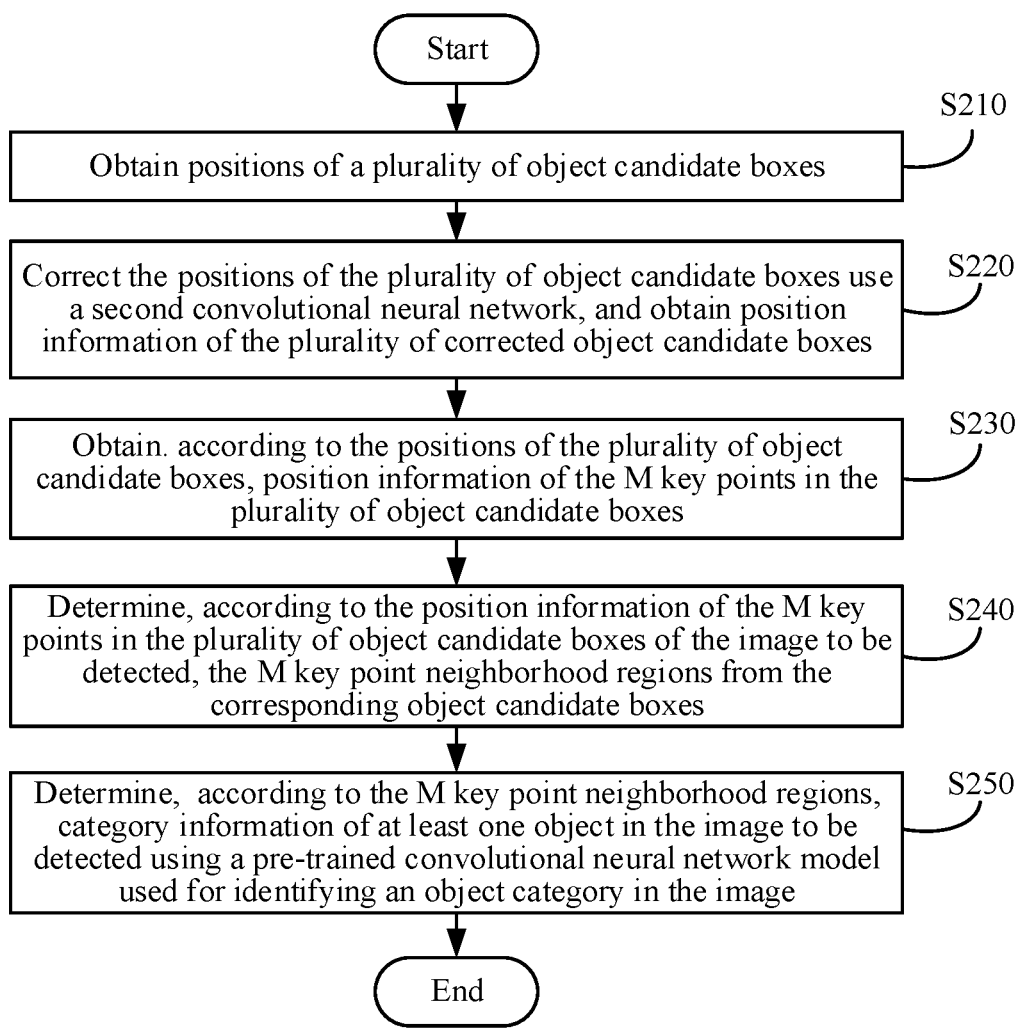
FIG. 2 illustrates a flowchart of another method for identifying an object category according to the embodiments of the present disclosure.

FIG. 2 is a flowchart of another method for identifying an object category according to the embodiments of the present disclosure. The method is executed by a device including an apparatus for identifying an object category.

With reference to FIG. 2, in step S210, positions of the plurality of object candidate boxes are obtained.

Specifically, obtaining the positions of the object candidate boxes is object positioning, and object positioning is to find an enclosing rectangular box of an object in the image. The position of the object candidate box is usually represented by coordinate data of both end points of each of the diagonals of the enclosing rectangle.

According to an exemplary embodiment of the present disclosure, step S210 includes: obtaining position information of the plurality of object candidate boxes by means of a first convolutional neural network, or obtaining position information of the plurality of object candidate boxes by means of a Selective Search method, or obtaining position information of the plurality of object candidate boxes by an Edge Box method. It should be noted that the first convolutional neural network may be an RPN.

The positions of the object candidate boxes obtained by the methods such as the Selective Search and RPN provide a data basis for subsequent key point prediction, and are beneficial to improve the accuracy of key point prediction results.

In step S220, the positions of the plurality of object candidate boxes are corrected using a second convolutional neural network, and position information of the plurality of corrected object candidate boxes is obtained.

Here, the second convolutional neural network may be a Faster R-CNN. By the Faster R-CNN method, the object candidate boxes may be mapped to the feature maps for pooling, and then features are extracted for regression. This step may make the positions of the object candidate boxes more accurately fit the objects. In practical application, for correction of the positions of the object candidate boxes, each candidate box may be converted into a 7*7 grid by an R-FCN method and then pooled in different channels for regression.

In step S230, position information of the M key points in the plurality of object candidate boxes is obtained according to the positions of the plurality of object candidate boxes.

Specifically, obtaining position information of the key points in the object candidate boxes according to the positions of the object candidate boxes may be considered as key point prediction. The key point prediction may be implemented by a convolutional neural network or other methods.

In a specific implementation, first, it is necessary to define key points for an object of each category. Taking a common object detection data set (such as PASCAL VOC) as an example, 20 object categories, such as a person, a dog, a train, and a chair, are preset, and objects other than the 20 categories are defined as a background category. Thus, the object identification problem translates into a classification problem involving 21 categories. For each category, the number of key points is defined. For example, if the category is a person, 11 key points, such as head, left hand, right hand, left shoulder, and right shoulder, may be defined, and if the category is a dog, 10 key points, such as head, limbs, and tail, may be defined. Second, a deep convolutional neural network may be trained to map the positions of the object candidate boxes to corresponding regions on the feature maps obtained after processing of all the convolutional layers, and to pool the corresponding regions obtained after the mapping, and key point distribution characteristics are obtained by learning of the convolutional neural network and are then regressed to obtain key points in the object candidate boxes. Since no category information is involved in this step, regression needs to be performed for possible key points of the 20 categories of objects. For the background category, the center is directly selected as the key point, and no regression prediction is performed. The object candidate box may not include all the key points, or there is a problem that a key point is covered, but usually there is still a key point prediction result. That is to say, assuming that the total number of key points of the 21 preset object categories is 200, position information of 200 key points is obtained according to the positions of the plurality of object candidate boxes.

According to one or more embodiments of the present disclosure, step S230 further includes: obtaining a second confidence corresponding to each key point according to the positions of the plurality of object candidate boxes, where the second confidence is data indicating the possibility that the key point exists in a candidate box. That is, while predicting the positions of the key points, the confidence of each key point (e.g., the second confidence) is predicted, and the predicted second confidence may provide a basis for determining which key point neighborhood regions are to be subsequently pooled.

In step S240, the M key point neighborhood regions are determined from the corresponding object candidate boxes according to the position information of the M key points in the plurality of object candidate boxes of the image to be detected.

The content of step S240 is the same as that of step S110 in the foregoing embodiment I, and details are not described herein again.

In step S250, category information of at least one object in the image to be detected is determined using a convolutional neural network model used for identifying, according to the M key point neighborhood regions, an object category in an image.

In addition to obtaining position information of the M key points, step S230 further includes obtaining a second confidence corresponding to each key point according to the positions of the plurality of object candidate boxes. Accordingly, step S250 may further include: marking the pooling result of a response map corresponding to a key point having a confidence (e.g., the second confidence) which does not meet a predetermined requirement as zero. Corresponding to the statement that the predicted second confidence may provide a basis for determining which key point neighborhood regions are to be subsequently pooled, specifically, a key point having a confidence (e.g., the second confidence) lower than a set confidence threshold is considered invalid, no subsequent pooling is performed on the neighborhood region of the key point, and the pooling result of a response map corresponding to the key point considered invalid is directly marked as zero. The processing makes it simpler to determine the category information of the object in the image to be detected according to the key point neighborhood regions by means of the convolutional neural network model, and not all the key point neighborhood regions need to be pooled.

On the basis of the embodiment above, the method for identifying an object category provided by this embodiment further includes the following technical effects:

first, the use of RPN, Selective Search, Edge Box and other methods is beneficial to accurate object positioning, so as to provide a data basis for subsequent key point prediction, and is also beneficial to making key point prediction results more accurate;

second, the positions of the candidate boxes are corrected by the Faster R-CNN method, which is beneficial to further improve the accuracy of object positioning; and third, while predicting the positions of the key points, a confidence corresponding to each key point is also predicted, and the predicted confidence (e.g., the second confidence) may provide a basis for determining which key point neighborhood regions are to be subsequently pooled, thereby simplifying the process of determining the category information of the object in the image to be detected according to the key point neighborhood regions and the convolutional neural network model.

Figure 3:
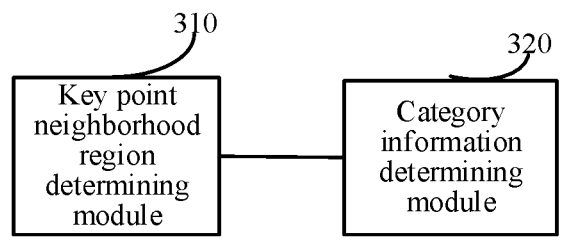
FIG. 3 illustrates a logic block diagram of an apparatus for identifying an object category according to the embodiments of the present disclosure.

FIG. 3 is a logic block diagram of an apparatus for identifying an object category according to the embodiments of the present disclosure, based on the same technical concept. With reference to FIG. 3, the apparatus for identifying an object category includes a key point neighborhood region determining module 310 and a category information determining module 320.

The key point neighborhood region determining module 310 is configured to determine, according to position information of M key points in a plurality of object candidate boxes of an image to be detected, M key point neighborhood regions from corresponding object candidate boxes, where M is less than or equal to the total number of key points of N preset object categories, for example, M is the total number of the key points of the N preset object categories, and M and N are positive integers.

The category information determining module 320 is configured to determine category information of at least one object in the image to be detected using a convolutional neural network model used for identifying, according to the M key point neighborhood regions, an object category in an image.

According to the apparatus for identifying an object category provided by this embodiment, key point neighborhood regions are determined from corresponding object candidate boxes according to position information of key points in object candidate boxes, and category information of an object in the image to be detected is further determined by means of the key point neighborhood regions and a convolutional neural network model used for identifying an object category in an image. By means of the position information of the key points, the defects of vagueness of information in the candidate boxes, and information loss caused for the identification process are avoided, thereby improving the identification accuracy of a single category or multiple categories of objects. It is especially advantageous to improve the identification accuracy of identification of multiple categories of objects.

Figure 4:
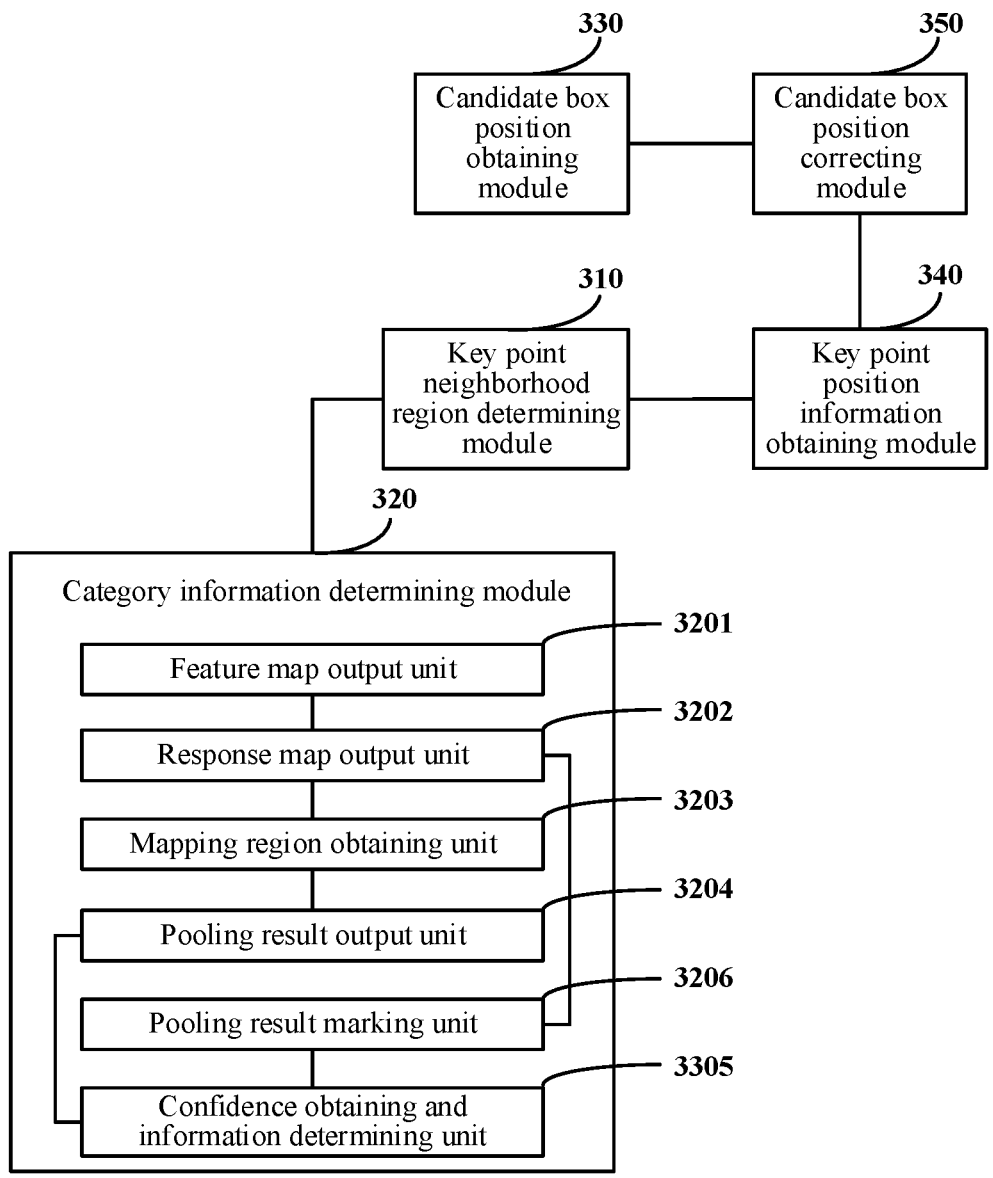
FIG. 4 illustrates a logic block diagram of another apparatus for identifying an object category according to the embodiments of the present disclosure.

FIG. 4 is a logic block diagram of an apparatus for identifying an object category according to the embodiments of the present disclosure, based on the same technical concept.

With reference to FIG. 4, According to one or more embodiments of the present disclosure, the convolutional neural network model includes K convolutional layers, a pooling layer, and an output layer, where K is a positive integer (for example, K is a positive integer greater than or equal to 2). The category information determining module 320 includes:

a feature map output unit 3201, configured to output, from the (K−1)th convolutional layer, feature maps having one-to-one correspondence to the M key points;

a response map output unit 3202, configured to output, from the Kth convolutional layer, a response map of a key point obtained after conversion of each of the feature maps;

a mapping region obtaining unit 3203, configured to respectively map the M key point neighborhood regions to the response maps of the corresponding key points to obtain M mapping regions;

a pooling result output unit 3204, configured to output pooling results corresponding to the M mapping regions from the pooling layer; and a confidence obtaining and information determining unit 3205, configured to obtain a first confidence of each preset object category from the output layer on the basis of the M pooling results, and determine the category information of the at least one object according to the first confidence relating to each preset object category.

According to one or more embodiments of the present disclosure, the confidence obtaining and information determining unit 3205 is configured to: average pooling results corresponding to key points of a same preset object category to obtain a score for each preset object category; and obtain a first confidence of each preset object category from the output layer according to the score for each preset object category.

According to one or more embodiments of the present disclosure, the apparatus for identifying an object category further includes: a model training module (not shown) configured to train the convolutional neural network model.

The model training module may be configured to: obtain a sample image including position information of the key points, object box marking information, and category marking information; perform convolution on the sample image to obtain a convolution result; determine, according to the object box marking information and the category marking information, whether object box position information and/or category information in the convolution result meets a training completion condition; in response to at least one of the object box position information or category information in the convolution result meets a training completion condition, complete training of the convolutional neural network model; and in response to at least one of the object box position information or category information in the convolution result does not meet a training completion condition, adjust parameters of the convolutional neural network model according to the object box position information and/or the category information in the convolution result, and perform iterative training on the convolutional neural network model according to the adjusted parameters of the convolutional neural network model, until the object box position information and/or the category information after the iterative training meets the training completion condition.

According to one or more embodiments of the present disclosure, the apparatus for identifying an object category further includes:

a candidate box position obtaining module 330, configured to obtain positions of the plurality of object candidate boxes; and a key point position information obtaining module 340, configured to obtain position information of the M key points in the plurality of object candidate boxes according to the positions of the plurality of object candidate boxes.

According to one or more embodiments of the present disclosure, the candidate box position obtaining module 330 is configured to obtain position information of the plurality of object candidate boxes by means of a first convolutional neural network, or obtain position information of the plurality of object candidate boxes by means of a Selective Search apparatus, or obtain position information of the plurality of object candidate boxes by means of an Edge Box apparatus.

According to one or more embodiments of the present disclosure, the key point position information obtaining module 340 is further configured to obtain a second confidence corresponding to each key point according to the positions of the plurality of object candidate boxes, where the second confidence is data indicating the possibility that a key point exists in the candidate box.

Accordingly, the category information determining module 320 may further includes: a pooling result marking unit 3206, configured to mark the pooling result of a response map corresponding to a key point having a second confidence which does not meet a predetermined requirement as zero.

According to one or more embodiments of the present disclosure, the apparatus for identifying an object category further includes: a candidate box position correcting module 350, configured to correct the positions of the plurality of object candidate boxes using a second convolutional neural network, and obtain position information of the plurality of corrected object candidate boxes.

According to one or more embodiments of the present disclosure, if the object category is a non-background category, the key point neighborhood region determining module 310 is configured to determine, according to size information of the corresponding object candidate boxes and a preset size multiple, M rectangular regions respectively centered on the positions of the M key points as the M key point neighborhood regions.

According to one or more embodiments of the present disclosure, if the object category is a background category, the key point neighborhood region determining module 310 is configured to determine regions of object candidate boxes corresponding to the position information of the M key points as the M key point neighborhood regions.

According to one or more embodiments of the present disclosure, the first convolutional neural network is an RPN, and/or the second convolutional neural network is a Faster R-CNN.

The apparatus for identifying an object category of this embodiment is configured to implement the corresponding method for identifying an object category in the forgoing method embodiments, and has the beneficial effects of the corresponding method embodiment. Details are not described below again.

In addition, the apparatus for identifying an object category of this embodiment may be disposed in a suitable electronic device including, but not limited to, a mobile terminal, a Personal Computer (PC), or the like.

Figure 5:
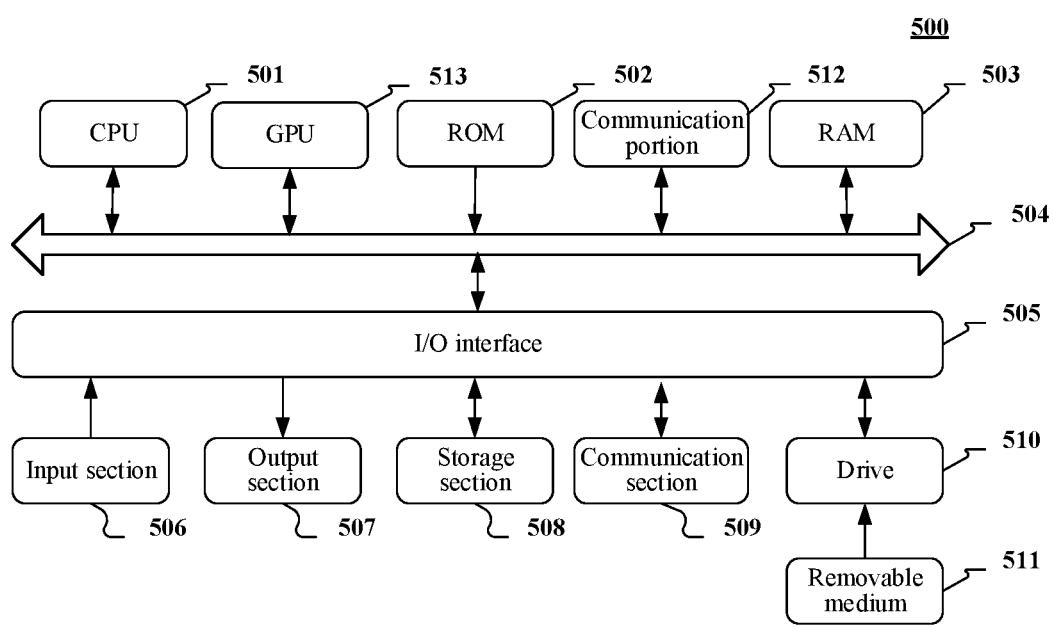
FIG. 5 illustrates a schematic structural diagram of an electronic device according to the embodiments of the present disclosure.

The embodiments of the present disclosure also provide an electronic device which, for example, is a mobile terminal, a PC, a tablet computer, a server, or the like. Referring to FIG. 5 below, a schematic structural diagram of an electronic device 500, which may be a terminal device or a server, suitable for implementing the embodiments of the present disclosure is shown. As shown in FIG. 5, the electronic device 500 includes one or more processors, a communication element, or the like. The one or more processors are, for example, one or more Central Processing Units (CPUs) 501 and/or one or more Graphic Processing Units (GPUs) 513, and may execute appropriate actions and processing according to executable instructions stored in a Read-Only Memory (ROM) 502 or executable instructions loaded from a storage section 508 to a Random Access Memory (RAM) 503. The communication element may include, but is not limited to, a communication portion 512 and a communication section 509.

The processor may communicate with the ROM 502 and/or the RAM 503 to execute the executable instructions, be connected to the communication element by means of a communication bus 504, and communicate with other target devices via the communication element, thereby completing corresponding operations of the method for identifying an object category provided by any one of the embodiments of the present disclosure, such as, determining, according to position information of M key points in a plurality of object candidate boxes of an image to be detected, M key point neighborhood regions from corresponding object candidate boxes, where M is less than or equal to the total number of key points of N preset object categories, for example, M is the total number of the key points of the N preset object category, and M and N are positive integers; and determining, according to the M key point neighborhood regions, category information of at least one object in the image to be detected using a convolutional neural network model used for identifying an object category in an image.

In addition, the RAM 503 may further store various programs and data required for operations of an apparatus. The CPU 501, the ROM 502, and the RAM 503 are connected to each other via the bus 504. In the presence of the RAM 503, the ROM 502 is an optional module. The RAM 503 stores executable instructions, or writes the executable instructions into the ROM 502 during running, where the executable instructions cause the processor 501 to execute corresponding operations of the foregoing communication method. An input/output (I/O) interface 505 is also connected to the bus 504. The communication part 512 may include, but is not limited to, a network card. The network card may include, but is not limited to, an Infiniband (IB) network card. The communication portion 512 may be integrated, or may be configured to have a plurality of sub-modules (for example, a plurality of IB network cards) connected to the bus.

The following components are connected to the I/O interface 505: an input section 506 including a keyboard, a mouse, or the like; an output section 507 including a Cathode-Ray Tube (CRT), a Liquid Crystal Display (LCD), a speaker, or the like; the storage section 508 including a hard disk, or the like; and a communication part 509 of a network interface card including an LAN card, a modem, or the like. The communication section 509 performs communication processing via a network such as the Internet. A drive 510 is also connected to the I/O interface 505 according to requirements. A removable medium 511 such as a magnetic disk, an optical disk, a magneto-optical disk, a semiconductor memory, or the like is mounted on the drive 510 according to requirements, so that a computer program read from the removable medium may be installed on the storage section 508 according to requirements.

It should be noted that the architecture illustrated in FIG. 5 is merely an optional implementation mode. During specific practice, the number and categories of the components in FIG. 5 may be selected, decreased, increased, or replaced according to actual requirements. Different functional components may be separated or integrated or the like. For example, the GPU and the CPU may be separated, or the GPU may be integrated on the CPU, and the communication portion may be separated from or integrated on the CPU or the GPU or the like. These alternative implementations all fall within the scope of protection of the present disclosure.

Particularly, a process described above with reference to a flowchart according to the embodiments of the present disclosure is implemented as a computer software program. For example, the embodiments of the present disclosure include a computer program product, which includes a computer program tangibly included in a machine-readable medium. The computer program includes a program code for executing a method shown in the flowchart. The program code may include corresponding instructions for correspondingly executing steps of the methods provided by the embodiments of the present disclosure, such as, determining, according to position information of M key points in a plurality of object candidate boxes of an image to be detected, M key point neighborhood regions from corresponding object candidate boxes, where M is less than or equal to the total number of key points of N preset object categories, for example, M is the total number of the key points of the N preset object category, and M and N are positive integers; and determining, according to the M key point neighborhood regions, category information of at least one object in the image to be detected using a convolutional neural network model used for identifying an object category in an image. In such embodiment, the computer program is downloaded and installed from the network through the communication section 509, and/or is installed from the removable medium 511. The computer program, when being executed by the CPU 501, executes the foregoing functions defined in the methods of the present disclosure.

The methods, apparatuses, and devices in the present disclosure may be implemented in many manners. For example, the methods, apparatuses, and devices in the present disclosure may be implemented with software, hardware, firmware, or any combination of software, hardware, and firmware. The foregoing sequence of steps of the methods is merely for description, and unless otherwise stated particularly, is not intended to limit the steps of the methods in the present disclosure. In addition, in some embodiments, the present disclosure may also be implemented as programs marked in a marking medium. The programs include machine-readable instructions for implementing the methods according to the present disclosure. Therefore, the present disclosure further covers the marking medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for identifying an object category, performed by an electronic device, comprising:
   determining, according to position information of M key points in a plurality of object candidate boxes of an image to be detected, M key point neighborhood regions from corresponding object candidate boxes, wherein M is less than or equal to the total number of key points of N preset object categories, and M and N are positive integers; and
   determining, according to the M key point neighborhood regions, category information of at least one object in the image to be detected using a convolutional neural network model used for identifying an object category in an image,
   wherein if the object category is a background category, the determining, according to position information of M key points in a plurality of object candidate boxes of an image to be detected, M key point neighborhood regions from corresponding object candidate boxes comprises:
   determining regions of object candidate boxes corresponding to the position information of the M key points as the M key point neighborhood regions.

2. The method according to claim 1, wherein the convolutional neural network model comprises K convolutional layers, a pooling layer, and an output layer, wherein K is a positive integer greater than or equal to 2; and
   the determining, according to the M key point neighborhood regions, category information of at least one object in the image to be detected using a convolutional neural network model used for identifying an object category in the image comprises:
   outputting, from a $(K-1)^{th}$ convolutional layer, feature maps having one-to-one correspondence to the M key points;
   outputting, from a $K^{th}$ convolutional layer, a response map of a key point obtained after conversion of each of the feature maps;

respectively mapping the M key point neighborhood regions to response maps of the corresponding key points to obtain M mapping regions;

outputting, from the pooling layer, M pooling results corresponding to the M mapping regions; and obtaining, from the output layer, a first confidence of each preset object category based on the M pooling results; and determining, according to the first confidence of the each preset object category, the category information of the at least one object.

3. The method according to claim 2, wherein the obtaining, from the output layer, a first confidence of each preset object category based on the M pooling results comprises:

averaging pooling results corresponding to key points of a same preset object category to obtain a score for the each preset object category; and obtaining, according to the score for the each preset object category, the first confidence of the each preset object category from the output layer.

4. The method according to claim 1, wherein prior to the determining, according to the M key point neighborhood regions, category information of at least one object in the image to be detected using a convolutional neural network model used for identifying an object category in an image, the method further comprises: training the convolutional neural network model; and the training the convolutional neural network model comprises:

obtaining a sample image comprising position information of key points, object box marking information, and category marking information;

performing convolution on the sample image to obtain a convolution result;

determining, according to the object box marking information and the category marking information, whether at least one of object box position information or category information in the convolution result meets a training completion condition;

in response to at least one of the object box position information or category information in the convolution result meets a training completion condition, completing training of the convolutional neural network model; and in response to at least one of the object box position information or category information in the convolution result does not meet a training completion condition, adjusting, according to at least one of the object box position information or category information in the convolution result, parameters of the convolutional neural network model, and performing, according to the adjusted parameters of the convolutional neural network model, iterative training on the convolutional neural network model, until at least one of object box position information or category information after the iterative training meets the training completion condition.

5. The method according to claim 1, wherein prior to the determining, according to position information of M key points in a plurality of object candidate boxes of an image to be detected, M key point neighborhood regions from corresponding object candidate boxes, the method further comprises:

obtaining positions of the plurality of object candidate boxes; and obtaining, according to the positions of the plurality of object candidate boxes, the position information of the M key points in the plurality of object candidate boxes.

6. The method according to claim 5, wherein the obtaining positions of the plurality of object candidate boxes comprises:

obtaining the position information of the plurality of object candidate boxes by means of a first convolutional neural network, or obtaining the position information of the plurality of object candidate boxes by means of a Selective Search method, or obtaining the position information of the plurality of object candidate boxes by an Edge Box method.

7. The method according to claim 6, wherein prior to the determining, according to position information of M key points in a plurality of object candidate boxes of an image to be detected, M key point neighborhood regions from corresponding object candidate boxes, the method further comprises:

correcting the positions of the plurality of object candidate boxes using a second convolutional neural network; and obtaining position information of the plurality of corrected object candidate boxes.

8. The method according to claim 5, wherein the obtaining the position information of the M key points in the plurality of object candidate boxes according to the positions of the plurality of object candidate boxes further comprises: obtaining, according to the positions of the plurality of object candidate boxes, a second confidence corresponding to each of the M key points, wherein the second confidence is data indicating the possibility that a key point exists in the candidate box; and the determining, according to the M key point neighborhood regions, category information of at least one object in the image to be detected using a convolutional neural network model used for identifying an object category in an image further comprises: marking a pooling result of a response map corresponding to a key point having a second confidence lower than a set confidence threshold as zero.

9. The method according to claim 1, wherein if the object category is a non-background category, the determining, according to position information of M key points in a plurality of object candidate boxes of an image to be detected, M key point neighborhood regions from corresponding object candidate boxes comprises:

determining, according to size information of the corresponding object candidate boxes and a preset size multiple, M rectangular regions respectively centered on positions of the M key points as the M key point neighborhood regions.

10. An electronic device for identifying an object category, comprising:

a processor; and a memory for storing instructions executable by the processor;

wherein execution of the instructions by the processor causes the processor to perform:

determining, according to position information of M key points in a plurality of object candidate boxes of an image to be detected, M key point neighborhood regions from corresponding object candidate boxes, wherein M is less than or equal to the total number of key points of N preset object categories, and M and N are positive integers; and determining, according to the M key point neighborhood regions, category information of at least one object in the image to be detected using a convolutional neural network model used for identifying an object category in an image, wherein if the object category is a background category, the determining, according to position information of M key points in a plurality of object candidate boxes of an image to be detected, M key point neighborhood regions from corresponding object candidate boxes comprises:

determining regions of object candidate boxes corresponding to the position information of the M key points as the M key point neighborhood regions.

11. The electronic device according to claim 10, wherein the convolutional neural network model comprises K convolutional layers, a pooling layer, and an output layer, wherein K is a positive integer greater than or equal to 2; and the determining, according to the M key point neighborhood regions, category information of at least one object in the image to be detected using a convolutional neural network model used for identifying an object category in the image comprises:

outputting, from a (K−1)th convolutional layer, feature maps having one-to-one correspondence to the M key points;

outputting, from a Kth convolutional layer, a response map of a key point obtained after conversion of each of the feature maps;

respectively mapping the M key point neighborhood regions to response maps of the corresponding key points to obtain M mapping regions;

outputting, from the pooling layer, M pooling results corresponding to the M mapping regions; and obtaining, from the output layer, a first confidence of each preset object category based on the M pooling results; and determining, according to the first confidence of the each preset object category, the category information of the at least one object;

wherein the obtaining, from the output layer, a first confidence of each preset object category based on the M pooling results comprises:

averaging pooling results corresponding to key points of a same preset object category to obtain a score for the each preset object category; and obtaining, according to the score for the each preset object category, the first confidence of the each preset object category from the output layer.

12. The electronic device according to claim 10, wherein prior to the determining, according to the M key point neighborhood regions, category information of at least one object in the image to be detected using a convolutional neural network model used for identifying an object category in an image, the method further comprises: training the convolutional neural network model; and the training the convolutional neural network model comprises:

obtaining a sample image comprising position information of key points, object box marking information, and category marking information;

performing convolution on the sample image to obtain a convolution result;

determining, according to the object box marking information and the category marking information, whether at least one of object box position information or category information in the convolution result meets a training completion condition;

in response to at least one of the object box position information or category information in the convolution result meets a training completion condition, completing training of the convolutional neural network model; and in response to at least one of the object box position information or category information in the convolution result does not meet a training completion condition, adjusting, according to at least one of the object box position information or category information in the convolution result, parameters of the convolutional neural network model, and performing, according to the adjusted parameters of the convolutional neural network model, iterative training on the convolutional neural network model, until at least one of object box position information or category information after the iterative training meets the training completion condition.

13. The electronic device according to claim 10, wherein prior to the determining, according to position information of M key points in a plurality of object candidate boxes of an image to be detected, M key point neighborhood regions from corresponding object candidate boxes, the method further comprises:

obtaining positions of the plurality of object candidate boxes; and obtaining, according to the positions of the plurality of object candidate boxes, the position information of the M key points in the plurality of object candidate boxes.

14. The electronic device according to claim 13, wherein the obtaining positions of the plurality of object candidate boxes comprises:

obtaining the position information of the plurality of object candidate boxes by means of a first convolutional neural network, or obtaining the position information of the plurality of object candidate boxes by means of a Selective Search method, or obtaining the position information of the plurality of object candidate boxes by an Edge Box method.

15. The electronic device according to claim 14, wherein before determining, according to position information of M key points in a plurality of object candidate boxes of an image to be detected, M key point neighborhood regions from corresponding object candidate boxes, the method further comprises:

correcting the positions of the plurality of object candidate boxes using a second convolutional neural network; and obtaining position information of the plurality of corrected object candidate boxes.

16. The electronic device according to claim 13, wherein the obtaining the position information of the M key points in the plurality of object candidate boxes according to the positions of the plurality of object candidate boxes further comprises: obtaining, according to the positions of the plurality of object candidate boxes, a second confidence corresponding to each of the M key points, wherein the second confidence is data indicating the possibility that a key point exists in the candidate box; and the determining, according to the M key point neighborhood regions, category information of at least one object in the image to be detected using a convolutional neural network model used for identifying an object category in an image further comprises: marking a pooling result of a response map corresponding to a key point having a second confidence lower than a set confidence threshold as zero.

17. The electronic device according to claim 10, wherein if the object category is a non-background category,
the determining, according to position information of M key points in a plurality of object candidate boxes of an image to be detected, M key point neighborhood regions from corresponding object candidate boxes comprises:
determining, according to size information of the corresponding object candidate boxes and a preset size multiple, M rectangular regions respectively centered on positions of the M key points as the M key point neighborhood regions.

18. A non-transitory computer readable storage medium with a computer program stored thereon, wherein the computer program comprises computer-readable instructions, wherein execution of the instructions by the processor causes the processor to perform:
determining, according to position information of M key points in a plurality of object candidate boxes of an image to be detected, M key point neighborhood regions from corresponding object candidate boxes, wherein M is less than or equal to the total number of key points of N preset object categories, and M and N are positive integers; and
determining, according to the M key point neighborhood regions, category information of at least one object in the image to be detected using a convolutional neural network model used for identifying an object category in an image,
wherein if the object category is a background category, the determining, according to position information of M key points in a plurality of object candidate boxes of an image to be detected, M key point neighborhood regions from corresponding object candidate boxes comprises:
determining regions of object candidate boxes corresponding to the position information of the M key points as the M key point neighborhood regions.

* * * * *